(12) United States Patent
Knebel et al.

(10) Patent No.: US 11,314,072 B2
(45) Date of Patent: Apr. 26, 2022

(54) MICROSCOPE SYSTEM WITH LIGHT SHEET MICROSCOPY FUNCTIONAL UNIT

(71) Applicant: Leica Microsystems CMS GmbH, Wetzlar (DE)

(72) Inventors: Werner Knebel, Kronau (DE); Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 193 days.

(21) Appl. No.: 16/624,976

(22) PCT Filed: Jun. 25, 2018

(86) PCT No.: PCT/EP2018/066943
§ 371 (c)(1),
(2) Date: Dec. 20, 2019

(87) PCT Pub. No.: WO2018/234582
PCT Pub. Date: Dec. 27, 2018

(65) Prior Publication Data
US 2020/0218046 A1    Jul. 9, 2020

(30) Foreign Application Priority Data
Jun. 23, 2017   (DE) .................... 10 2017 114 029.8

(51) Int. Cl.
*G02B 21/06* (2006.01)
*G02B 21/00* (2006.01)
(Continued)

(52) U.S. Cl.
CPC ......... *G02B 21/06* (2013.01); *G02B 21/0076* (2013.01); *G02B 21/24* (2013.01); *G02B 21/367* (2013.01); *G02B 21/0032* (2013.01)

(58) Field of Classification Search
None
See application file for complete search history.

(56) References Cited

U.S. PATENT DOCUMENTS 9,057,879 B2    6/2015  Knebel et al.
2012/0320438 A1  12/2012 Knebel et al.
(Continued)

FOREIGN PATENT DOCUMENTS

CN        102830488 A      12/2012
CN        105467572 A       4/2016
(Continued)

OTHER PUBLICATIONS

Yang, Zhe et al. "Dual-Slit confocal light sheet microscopy for in vivo whole-brain imaging of zebrafish," Biomedical Optics Express, vol. 6, No. 5, May 1, 2015, p. 1797, XP055514896.

*Primary Examiner* — Darryl J Collins
*Assistant Examiner* — Tamara Y. Washington
(74) *Attorney, Agent, or Firm* — Leydig, Voit & Mayer, Ltd.

(57) ABSTRACT

A microscope system includes a light sheet microscopy functional unit and at least one further light microscopy functional unit. The light sheet microscopy functional unit has an illumination objective which is formed by a first objective and a detection objective which is formed by a separate second objective. The at least one further light microscopy functional unit has a detection objective that is formed by the second objective.

21 Claims, 9 Drawing Sheets

(51) Int. Cl.
   *G02B 21/24* (2006.01)
   *G02B 21/36* (2006.01)

(56) References Cited

U.S. PATENT DOCUMENTS

2013/0107358 A1   5/2013   Knebel et al.
2016/0320301 A1   11/2016  Knebel et al.

FOREIGN PATENT DOCUMENTS

| DE | 102011054914 A1 |   | 5/2013 |            |
|----|-----------------|---|--------|------------|
| DE | 102013226277 A1 |   | 6/2015 |            |
| DE | 102016104651 A1 | * | 9/2016 | G02B 21/367 |
| DE | 102016104651 A1 |   | 9/2016 |            |

* cited by examiner

MICROSCOPE SYSTEM WITH LIGHT SHEET MICROSCOPY FUNCTIONAL UNIT

CROSS-REFERENCE TO PRIOR APPLICATIONS

This application is a U.S. National Phase Application under 35 U.S.C. § 371 of International Application No. PCT/EP2018/066943, filed on Jun. 25, 2018, and claims benefit to German Patent Application No. DE 10 2017 114 029.8, filed on Jun. 23, 2017. The International Application was published in German on Dec. 27, 2018 as WO 2018/234582 under PCT Article 21(2).

FIELD

The invention relates to a microscope system comprising a light sheet microscopy functional unit, the illumination objective of which is formed by a first objective and the detection objective of which is formed by a separate second objective, and at least one further light microscopy functional unit.

BACKGROUND

So-called light sheet microscopes, in which only a thin layer in the sample is illuminated have found use in recent times, particularly in fluorescence microscopy. In comparison with conventional fluorescence microscopes, light sheet microscopes thus facilitate a higher resolution and a lower light exposure, as a result of which unwanted effects due to bleaching or light-induced stress in biological samples are avoided. Therefore, light sheet microscopes can be used particularly advantageously for fluorescence examinations on living organisms.

The prior art has disclosed various optical arrangements for realizing a light sheet microscope. In the context of the present invention, arrangements in which illumination and detection are implemented by way of two separate objectives, in particular, should be specified here. Here, the illumination objective and the detection objective are usually disposed perpendicular to one another. However, this perpendicular arrangement of the objectives is disadvantageous, in particular, in that it can only be integrated with difficulties in already existing microscope systems, e.g., confocal systems.

Deviating from the aforementioned perpendicular arrangement, the prior art has disclosed light sheet microscopes in which the illumination objective and the detection objective are opposite one another along the vertical axis of the microscope limb. One example of this is disclosed in the document DE 10 2011 054 914 A1. In order also to be able to generate a light sheet lying perpendicular to the detection axis in the case of such an arrangement, the illumination light beam passing through the illumination objective along the vertical limb axis is directed on a mirror system that deflects the illumination light beam at a right angle in order to illuminate the sample with a light sheet in the horizontally disposed focal plane of the detection objective. Then, the target region of the sample lying in the focal plane is imaged onto a camera sensor by means of the detection objective.

Document U.S. Pat. No. 9,057,879 B2 has disclosed a microscope system that combines a light sheet microscopy functional unit with a confocal microscopy functional unit. In this system, the light sheet illumination and the confocal illumination and detection are implemented by way of one and the same microscope objective. By contrast, a separate objective is provided for the light sheet detection.

Since the light sheet microscopy functional unit and the confocal microscopy functional unit operate using different detection objectives in the aforementioned microscope system, the image data obtained according to the two different microscopy applications cannot readily be related to one another, i.e., correlated with one another.

SUMMARY

In an embodiment, the present invention provides a microscope system having a light sheet microscopy functional unit and at least one further light microscopy functional unit. The light sheet microscopy functional unit has an illumination objective which is formed by a first objective and a detection objective which is formed by a separate second objective. The at least one further light microscopy functional unit comprises a detection objective that is formed by the second objective.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
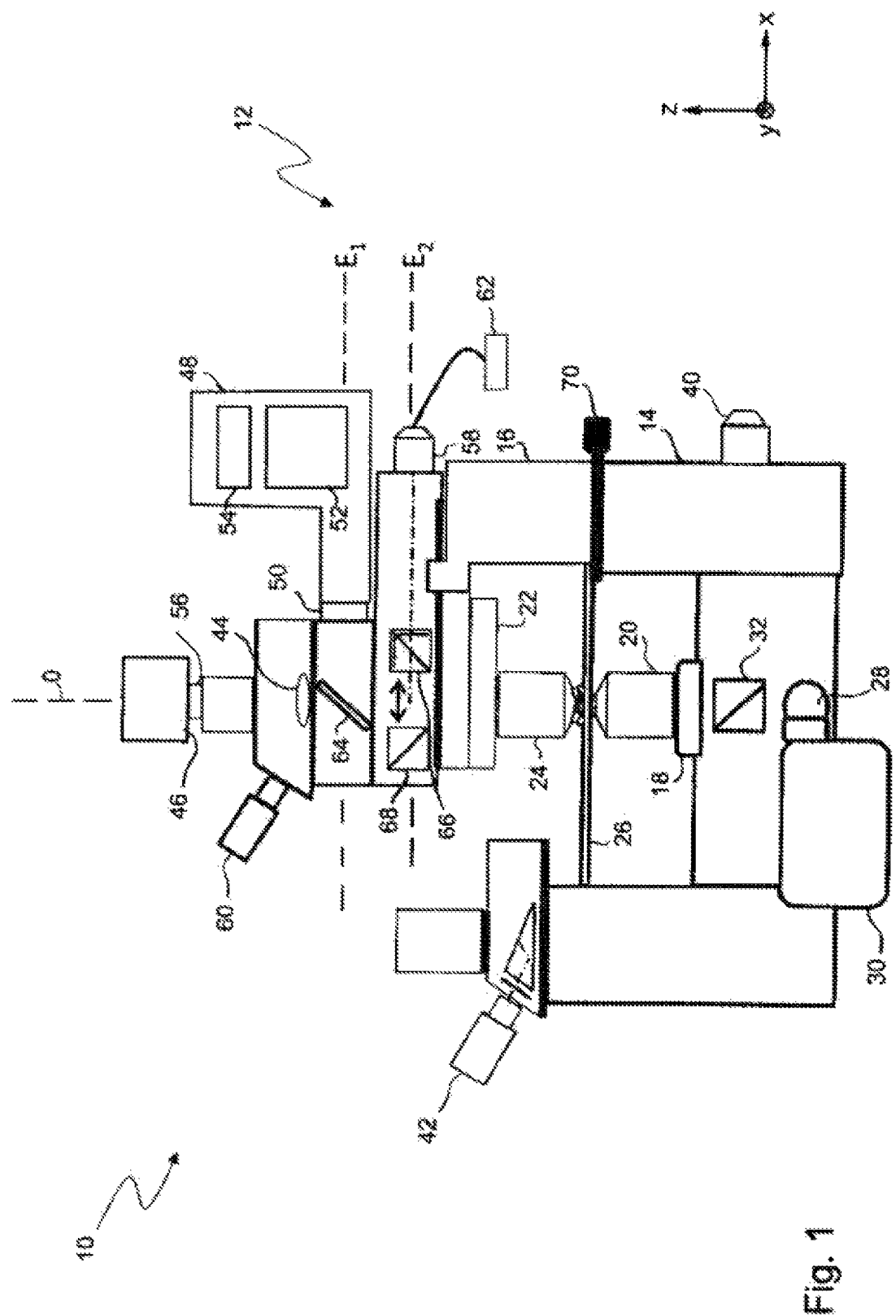
FIG. 1 shows the schematic structure of a microscope system as an exemplary embodiment.

In an embodiment, the present invention develops a microscope system, which is formed from a light sheet microscopy functional unit and a further light microscopy functional unit, in such a way that a simple and precise evaluation of the image data obtained by the two functional units is rendered possible.

The invention achieves this development according to an embodiment by a microscope system comprising a light sheet microscopy functional unit, the illumination objective of which is formed by a first objective and the detection objective of which is formed by a separate second objective, and at least one further light microscopy functional unit, wherein said further light microscopy functional unit comprises a detection objective that is formed by the second objective.

Thus, an embodiment of the invention provides a microscope system which combines a light sheet microscopy functional unit and a further light microscopy functional unit, e.g. a confocal microscopy functional unit, in such a way that the two functional units receive the detection light originating from the sample to be imaged using one and the same detection objective. The use of a single detection objective allows the sample to be imaged under the application of different microscopy processes without a sample transfer being required when changing from one process to the other process. This significantly simplifies the handling of the microscope system. Thus, a microscope system according to the invention allows correlative microscopy to be carried out for light sheet microscopy and a further light microscopy method in a particularly simple and error-minimizing manner.

In particular, the microscope system according to an embodiment of the invention can be used in the following way that the sample is initially examined in unintrusive and quick fashion by light sheet microscopy and subsequently imaged by the further light microscopy functional unit for the purposes of obtaining additional image data. Here, it is conceivable that such a further recording of the sample facilitates a higher resolution of sample regions of interest, for example.

In a preferred embodiment, the microscope system comprises an evaluation unit for a correlated image evaluation on the basis of detection light in each case received by the light sheet microscopy functional unit and the further light microscopy functional unit by way of the commonly used detection objective that is formed by the second objective. This advantageous correlated image evaluation is rendered possible by the two microscopy functional units receiving the detection light from one and the same sample plane in each case, said sample plane being defined by the focal plane of the detection objective assigned to the two functional units together. A correlated image evaluation within the meaning of the present invention should be understood to mean an evaluation of the image data, in which use is made both of image data obtained by means of the light sheet microscopy functional unit and of image data obtained by means of the further light microscopy functional unit. In particular, a correlated image evaluation may contain a combination by calculation of two or more images or partial images of the two functional units together to form at least one resultant image, for example by addition (superposition) or subtraction or other mathematical operations.

Preferably, the further light microscopy functional unit comprises an illumination objective that is formed by the second objective. Thus, the detection objective used together by the two microscopy functional units simultaneously represents the illumination objective of the further light microscopy functional unit in this embodiment. The other (first) objective is then only assigned to the light sheet microscopy functional unit, specifically as an illumination objective.

In a particularly preferred embodiment, the microscope system comprises a microscope limb that is composed of a first limb part, at which the first objective is held, and a second limb part, at which the second objective is held lying opposite to the first objective. Here, the aforementioned microscope limb should be understood to be a microscope body that comprises a number of ports that provide mechanical interfaces, in particular for the purposes of light supply and light removal. By way of example, cameras, eyepieces, scanners and manipulators can be attached to the microscope limb by way of these interfaces. Accordingly, the aforementioned limb parts should be considered partial microscope bodies, from which the microscope limb or the microscope body is composed.

In the context of an embodiment of the present invention, the two limb parts are separated from one another from a functional point of view by a microscope stage, which comprises a sample chamber for receiving the sample to be imaged. If the exemplary assumption is made that one of the two limb parts is a lower limb part and the other limb part is an upper limb part in the use position and orientation of the microscope system, the aforementioned functional separation of the limb parts means that the illumination and detection components assigned to the lower limb part are effective from below the microscope stage while the illumination and detection components assigned to the upper limb part are effective from above the microscope stage.

In this context, it should be noted that the microscope system according to the invention can be embodied both as an upright microscope and as an inverted microscope. Here, in the present case, an upright microscope is understood to mean an arrangement in which the common detection objective is disposed above the microscope stage. By contrast, the common detection objective is situated below the sample stage in the case of an inverted microscope embodiment.

Preferably, the microscope system comprises a light deflection apparatus that deflects an illumination focus into a focal plane of the second objective, said illumination focus having been generated by the light sheet microscopy functional unit by way of the first objective. Such a light deflection apparatus allows the light sheet to be able to be generated in coplanar fashion with the focal plane of the detection objective, even in an arrangement in which the two objectives of the microscope system are opposite one another.

Preferably, the light deflection apparatus comprises at least one mirror element that deflects the illumination focus perpendicular to the optical axis of the second objective. This mirror element is preferably attached to the first objective or to the second objective, although an attachment to other elements of the microscope system, e.g., the coverslip or one of the two limb parts, is likewise conceivable. In a preferred embodiment, two mirror elements are provided on both sides of the optical axis.

In a specific configuration, the light sheet microscopy functional unit comprises an area sensor, disposed in the second limb part, for detecting the detection light received by the second objective. By way of example, the area sensor is embodied as a CCD or CMOS camera.

In a further embodiment, the further light microscopy functional unit comprises an illumination module, assigned to the second limb part, for a point-scanning sample illumination and/or for a wide-field sample illumination. Here, the formulation "assigned" should express that the aforementioned illumination module can both be disposed within the second limb part and be coupled to the second limb part by way of a suitable interface.

In an exemplary embodiment, the illumination module contains a scanner for the point-scanning sample illumination. By way of example, such a scanner can be configured in the form of a mirror scanner known per se, as is used in a conventional confocal microscope.

In the aforementioned case, the illumination module comprises a pointer sensor in a specific embodiment, said point sensor forming a so-called descanned detector for the detection light received by the second objective. As a descanned detector, the point sensor receives the detection light following its return to the scanner as a stationary light beam.

A light source providing light for the illumination module can be integrated into the illumination module or else however be coupled thereon, for example by way of an optical fiber. Here, the light source itself may comprise a plurality of individual light sources, for example a plurality of lasers and/or laser diodes (of different wavelengths, in particular).

In addition or as an alternative thereto, the area sensor of the light sheet microscopy functional unit can simultaneously form a non-descanned detector, assigned to the further light microscopy functional unit, for the detection light received by the second objective. In this case, the detection light received by the further light microscopy functional unit is not (or not exclusively) returned to the point-scanning scanner but directly guided onto the area sensor, facilitating a direct comparison of the image data detected by the two microscopy functional units.

In one embodiment, the first limb part likewise comprises a detector, preferably a non-descanned detector, which facilitates an additional or alternative detection by way of the first limb part.

In a preferred embodiment, the light sheet microscopy functional unit comprises a light sheet generator, which is assigned to the first limb part. By way of example, such a light sheet generator contains a light source and a scanner disposed downstream of the light source, said scanner moving through the illumination focus in such a way that a quasi-static light sheet is constructed. In an alternative embodiment, a light sheet-generating optical unit, e.g., a cylindrical lens, may also be provided in place of the scanner. However, the light source (e.g., one or more lasers) need not be part of the light sheet generator; instead, it may also only be connected to the latter, for example by way of an optical fiber. Here, it is conceivable for the light sources of the light sheet generator (of the light sheet microscopy functional unit) and the illumination module (of the further light microscopy functional unit) to be housed in the same housing or even to be at least partly identical; i.e., one laser to find use for both light sources, for example.

In a particularly preferred configuration, the microscope system comprises an adjustment apparatus for adjusting the second limb part or at least parts (subunits) of the second limb part relative to the first limb part or relative to at least parts (subunits) of the first limb part. Consequently, it is conceivable that such an adjustment apparatus only adjusts one or more subunits, such as, e.g., an objective holder (objective port), of the second limb part relative to the first limb part (or to at least relative to subunits of same) but also that the adjustment apparatus adjusts the second limb part relative to the first limb part (or to at least relative to a subunit thereof) as a whole. An adjustment should be understood to mean, in particular, a movement, which may contain a displacement and/or a pivot and/or a rotation. A drive unit or mechanism could move, e.g., the first limb part relative to the reference system of the space in which the microscope is situated for the purposes of adjusting the second limb part relative to the first limb part ("relative adjustment"); however, alternatively or additionally, said drive unit or mechanism could also move the second limb part. An equivalent statement applies to the subunits of the limb parts.

Such an adjustment apparatus may consequently comprise, in particular, a displacement unit that is embodied to displace the second limb part and/or at least one subunit of the second limb part (such as an objective holder, for example) at least in a direction relative to the first limb part (or at least relative to subunits of same) in a displacement plane that lies perpendicular to the optical axis of the second objective. A number of advantages arise as a result of this lateral displaceability, such as for example an enlargement of the detectable sample space. Particularly if two mirror elements are disposed at a comparatively large distance from one another on both sides of the optical axis for the purposes of generating the light sheet and if the illumination image field is so small that the mirror elements can no longer be sufficiently illuminated through the illumination objective (i.e., said mirror elements no longer sufficiently deflect the illumination focus), a lateral displacement of one of the two limb parts allows one of the mirror elements to be driven to, i.e., illuminated, according to requirements. Moreover, it is possible to use the illumination objective in the central region, and not at the edge, of the illumination image field during the image recording (i.e., it is possible to position the mirror element in the central region of the illumination objective), which leads to an increase in the optical performance (imaging performance), in particular to a reduction in the transverse chromatic aberrations. It is also possible to use an illumination objective with a greater magnification and hence with a greater numerical aperture (in the case of the same diameter of the entrance pupil). The option of using the illumination objective in the central region of the illumination image field moreover simplifies the displacement of the illumination focus along the optical axis, which is provided in specific light sheet applications.

A displacement unit can also be embodied in such a way that, as an alternative or in addition to the above-described functionality, a displacement of the second limb part and/or of at least one subunit of the second limb part is facilitated parallel to the optical axis of the first and/or second objective. By way of example, a displacement of the objective port of the second limb part parallel to the optical axis of the second objective is conceivable. As an alternative or in addition thereto, the adjustment apparatus may also comprise a possibly further displacement unit, which facilitates a displacement of the first limb part and/or at least one subunit of the first limb part parallel to the optical axis of the first and/or second objective.

In a further advantageous embodiment, the adjustment apparatus comprises a pivot unit that is embodied to pivot the second limb part and/or at least one subunit of the second limb part relative to the first limb part (or at least relative to subunits of same) about a pivot axis that lies perpendicular to the optical axis of the first objective and/or perpendicular to the optical axis of the second objective.

In a further advantageous embodiment, the adjustment apparatus comprises a rotation unit that is embodied to rotate the second limb part and/or at least one subunit of the second limb part relative to the first limb part (or at least relative to subunits of same) about an axis of rotation that lies parallel to the optical axis of the first objective and/or parallel to the optical axis of the second objective.

In a further embodiment, the displacement unit is embodied to displace a subunit of the second limb part relative to the first limb part in the displacement plane lying parallel to a focal plane of the second objective. Further, the pivot unit is embodied to pivot the second limb part in the totality thereof relative to the first limb part about the pivot axis. This option of a coupled displacement/pivot movement offers a multiplicity of setting options, which can be freely chosen depending on the application.

Preferably, the further light microscopy functional unit is assigned in the totality thereof to the second limb part. This facilitates a particularly compact structure of the microscope system.

In an advantageous configuration, the further light microscopy functional unit forms a point-scanning microscope, in particular a scanning microscope.

By way of example, the aforementioned scanning microscope is a confocal microscope. By combining a light sheet microscope and a confocal microscope, which have the common detection objective as an interface, it is possible to obtain image data from one and the same sample region under the application of different microscopy processes and to correlate said image data with one another. By way of example, an overview image of a sample region is initially recorded with the aid of the light sheet microscope. If a location that should be imaged at a higher resolution, for example, is found within this overview image, there is a switch from the light sheet microscope to the confocal microscope.

In a further embodiment, the scanning microscope can be a multiphoton microscope. To this end, the microscope system comprises an illumination module that comprises a multiphoton laser and a scanner. The detection of the photons excited in the illuminated sample region can be implemented in the descanned mode by virtue of the detection light being returned to the scanner and then being guided to a point sensor. A detection by way of a non-descanned mode is also conceivable; here, the detection light is, for example, decoupled upstream of the scanner and guided to a detector.

In further embodiments, the scanning microscope may also be a STED (stimulated emission depletion) microscope or a RESOLFT (reversible saturable optical fluorescence depletion) microscope.

In another embodiment, the scanning microscope may also be embodied as a CARS/SRS (coherent anti-Stokes Raman scattering/stimulated Raman scattering) microscope.

In further other embodiments, the scanning microscope can also be a microscope for carrying out fluorescence lifetime imaging microscopy (FLIM; FLIM microscope) or a microscope for carrying out fluorescence correlation spectroscopy (FCS; FCS microscope) or a spectral microscope. A spectral microscope is understood to be a microscope that offers the option of simultaneously or sequentially detecting a plurality of spectral regions from the emission spectrum of the employed fluorescence markers. In principle, a spectral microscope is suitable for measuring the spectrum of the detected light.

In the case of a scanning microscope (e.g., confocal microscope, multiphoton microscope, STED microscope, CARS/SRS microscope, FLIM microscope, FCS microscope, spectral microscope) as a light microscopy functional unit, the detection light can alternatively be guided also directly onto an area sensor in the non-descanned mode, said area sensor simultaneously forming the detector of the light sheet microscope. In this case, the detection light carries out a scanning movement on the area sensor, said scanning movement corresponding to the scanning movement of the illumination light on the sample caused by the scanner.

The further light microscopy functional unit provided in addition to the light sheet microscopy functional unit can also form a wide-field microscope, in particular a localization microscope.

According to a further embodiment of the present invention, a method is provided for microscopic imaging of a sample using a microscope system comprising a light sheet microscopy functional unit, the illumination objective of which is formed by a first objective and the detection objective of which is formed by a separate second objective, and at least one further light microscopy functional unit, wherein the second objective is used as a common detection objective, both for imaging the sample by means of the light microscopy functional unit and for imaging the sample by using the further light microscopy functional unit.

FIG. 1 shows a schematic illustration of a microscope system 10, which represents an exemplary embodiment of the present invention.

The microscope system 10 comprises a microscope limb, denoted by 12 overall, said microscope limb being formed from a lower limb part 14 and an upper limb part 16 placed thereon. A first objective 20 is attached to the lower limb part 14 by way of an objective port 18. Accordingly, a second objective 24 is attached to the upper limb part 16 by way of an objective port 22. The two objectives 20 and 24, which are shown again in FIG. 2 on their own, lie opposite one another along an optical axis O, which extends parallel to the z-axis in relation to the xyz-coordinate system as per FIG. 1. Consequently, the objectives 20 and 24 are arranged on both sides of a microscope stage 26, which comprises a sample chamber, not explicitly shown in FIGS. 1 and 2, which is embodied, for example, in the form of a petri dish provided with a glass base.

A light sheet generator 30 is coupled to the lower limb part 14 by way of a port 28. The light sheet generator 30 serves to generate a light sheet-type illumination light distribution, which is coupled into the first objective 20, for example via a mirror or a dichroic beam splitter 32. To this end, the light sheet generator 30 comprises light sheet-generating components, known per se and not shown in FIG. 1, such as a light source and a scanner that sets the illumination light emitted by the light source into a scanning motion. As a consequence of this scanning motion, an illumination focus produced by the first objective 20 generates the light sheet serving for the sample illumination, said illumination focus being denoted by 34 in FIG. 2.

Figure 2:
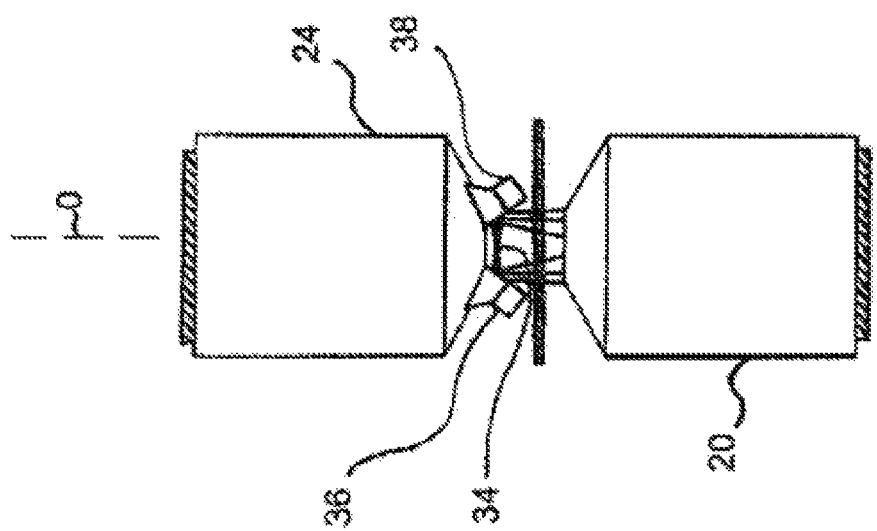
FIG. 2 shows an illustration of the two objectives provided in the microscope system according to FIG. 1.

As shown further in FIG. 2, two mirror elements 36, 38 disposed on both sides of the optical axis O are attached to the second objective 24 which faces the first objective 20, said mirror elements deflecting the illumination focus 34, which emerges from the first objective 20 parallel to the optical axis O, perpendicular to the optical axis O into a focal plane of the second objective 24. The light sheet generated by the deflected illumination focus 34 is consequently disposed in coplanar fashion with respect to the focal plane of the second objective 24.

As is evident from the explanations made above, the first objective 20 disposed at the lower limb part 14 serves as an illumination objective in the exemplary embodiment according to FIG. 1, said illumination objective illuminating the sample to be imaged with the light sheet in the focal plane of the second objective 24. Therefore, the first objective 20 is also referred to as light sheet illumination objective below.

Further, situated on the lower limb part 14 there are further ports which form interfaces for coupling on microscope components that, in particular, serve to supply light into the lower limb part 14 or to remove light from the lower limb part 14. A port 40 is shown in exemplary fashion in FIG. 1, said port serving to couple on a further light source that emits illumination light in the direction of the dichroic beam splitter 32. Further, eyepieces 42 are attached to the lower limb part 14.

In the exemplary embodiment according to FIG. 1, the objective 24 lying opposite the light sheet illumination objective 20 serves, firstly, to detect the detection light originating from the sample illuminated by the light sheet. To this end, the second objective 24 guides the detection light via a tube optical unit 44 to an area sensor 46, which is embodied as a CCD or CMOS camera, for example. Secondly, in terms of function, the objective 24 is assigned to a confocal illumination module 48, which is coupled to the upper limb part 16 by way of a port 50. In this function, the objective 24 serves both as illumination objective, by virtue of guiding illumination light, which is generated by a light source, not plotted, contained in the confocal illumination module 48 and which is guided by way of a confocal scanner 52 likewise contained in the confocal illumination module 48, onto the sample to be imaged, and as a detection objective, by virtue of guiding detection light generated by the confocal sample illumination back into the upper limb part 16 into the confocal illumination module 48, in which the detection light is detected by a point sensor 54. Since the detection light is returned into the confocal scanner 52, the point sensor 54 operates in a manner known per se as a so-called descanned sensor. On account of the dual function of the second objective 24, as explained above, the latter is also referred to as common illumination/detection objective below.

Like the lower limb part 14, the upper limb part 16 is also provided with a number of ports that define interfaces for coupling external components to the limb part 16. In addition to the aforementioned port 50, on which the confocal illumination module 48 is attached, the limb part 16 has a port 56 for coupling the area sensor 46 and a port 58 for coupling an LED lamp 62. Here, the two ports 50 and 58 define two parallel interface planes $E_1$, $E_2$, which have a well-defined (in particular conjugate) position and orientation relative to the image-side focal plane and/or relative to the object-side focal plane of the common illumination/detection objective 24. Advantageously, the ports 50 and 58 themselves also have a well-defined (in particular known) position and orientation, for example in relation to the common illumination/detection objective 24 and/or relative to the image-side and/or object-side focal plane. The interface plane $E_2$ defines a so-called reflected light axis in the exemplary embodiment according to FIG. 1, the light emitted by the LED lamp 62 being guided onto the common illumination/detection objective 24 along said axis. Further, eyepieces 60 are disposed on the upper limb part 16.

In addition to the above tube optical unit 44 disposed upstream of the area sensor 46, which was already mentioned above, the upper limb part 16 contains a beam splitter mirror 64 (depending on the application, this can be, e.g., a beam splitter (optionally flexibly introducible into the beam path) or a mirror, which may also be complemented by further filters) disposed in the first interface plane $E_1$ and a filter cube 66 and a dichroic beam splitter 68 which are disposed in the second interface plane $E_2$ and hence on the reflected light axis. In a manner known per se, the aforementioned optical components 64, 66 and 68 are positioned on the optical axis O of the common illumination/detection objective 24 depending on the application in order to influence the illumination light and the detection light within the upper limb part 16 as desired. In particular, what can be achieved by an appropriately chosen beam splitter as a beam splitter mirror 64 (when suitable dyes are used) is a splitting in accordance with the type of illumination (confocal illumination or illumination by a light sheet) and hence a parallel detection of the detection light of both types of illumination. Splitting according to polarization directions when using a corresponding beam splitter (or in combination with polarization filters) is also conceivable.

The microscope system 10 according to FIG. 1 represents a modular arrangement of various functional units, which can be used for imaging either on their own or else together. In particular, the microscope system 10 contains a light sheet microscopy functional unit, the essential functional components of which are given by the light sheet generator 30 and the light sheet illumination objective 20 in view of the illumination and are given by the common illumination/detection objective 24 and the area sensor 46 in view of the detection. Further, the microscope system 10 comprises a further, confocal microscopy functional unit, the essential components of which are given by the confocal illumination module 48 and by the common illumination/detection objective 24, both in view of the illumination and in view of the detection.

In the exemplary embodiment according to FIG. 1, explained above, the confocal microscopy functional unit detects the detection light originating from the sample by means of the point sensor 54 in the so-called descanned mode, following the return of said detection light on the confocal scanner 52. However, it is likewise possible for the detection light to be guided directly onto the area sensor 46 in the so-called non-descanned mode. In this case, the detection light carries out a scanning movement on the area sensor 46, said scanning movement corresponding to the scanning movement of the illumination light on the sample caused by the confocal scanner 52.

The microscope system 10 according to FIG. 1 further comprises a displacement unit 70, which allows the upper limb part 16 to be moved relative to the lower limb part 14 in the xy-plane, i.e., perpendicular to the optical axis O. In particular, this option of a lateral displacement allows the light sheet illumination objective 20 to be used in the central region of the image field and not at the edge thereof, which, inter alia, facilitates a higher optical imaging performance (in particular, lower transverse chromatic aberrations).

FIGS. 3 to 9 show a string of modifications of the microscope system 10 according to the invention according to FIG. 1, wherein, for the purposes of simplifying the description, the components of these modifications that correspond to the components shown in FIG. 1, in any case in terms of their fundamental functions, are provided with the reference signs used in FIG. 1.

Figure 3:
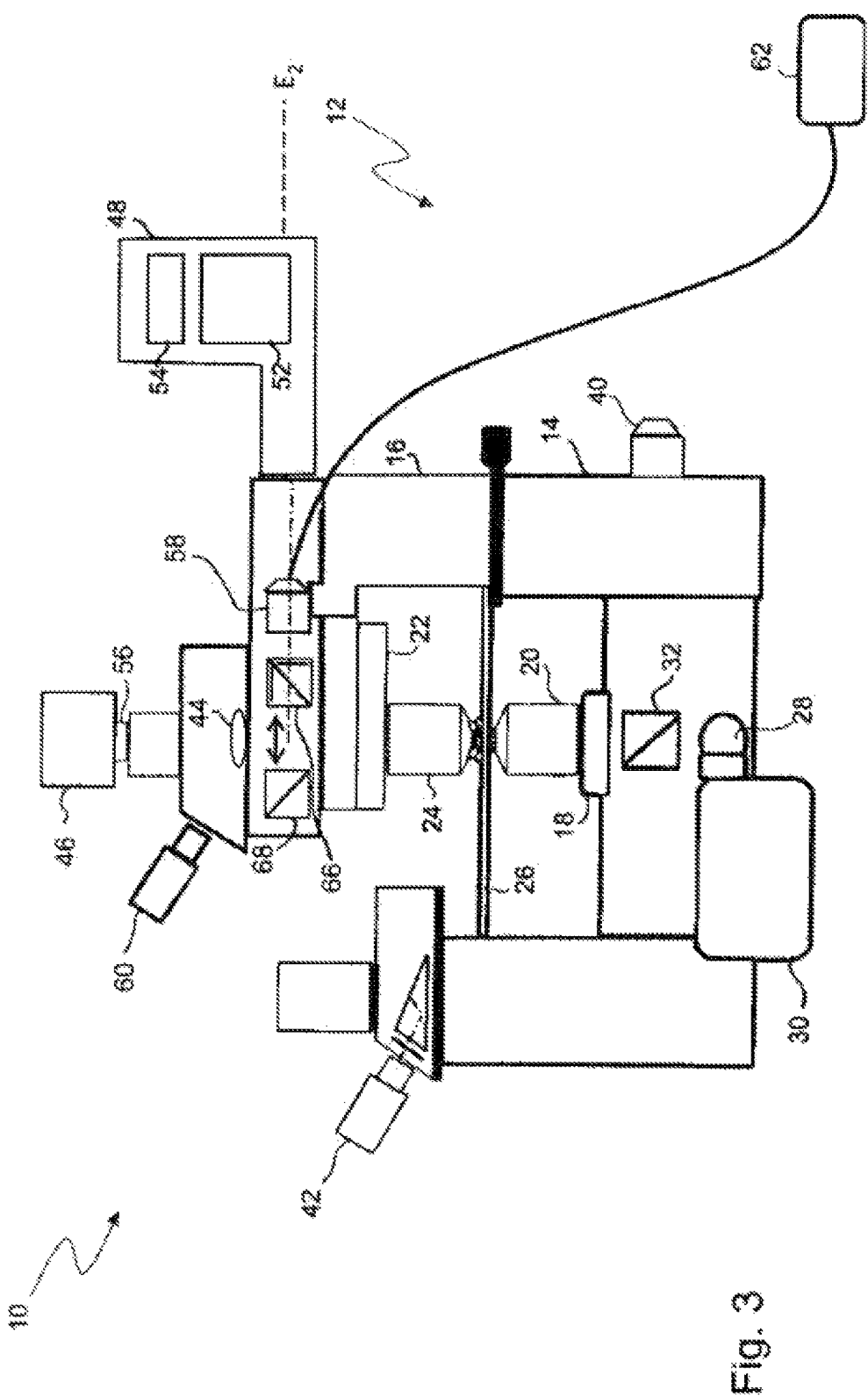
FIG. 3 shows a modification of the microscope system.

The modified embodiment according to FIG. 3 differs from the exemplary embodiment according to FIG. 1 substantially in that the first interface plane $E_1$ has been omitted and the confocal illumination module 48 is coupled-on in the second interface plane $E_2$, i.e., along the reflected light axis.

Figure 4:
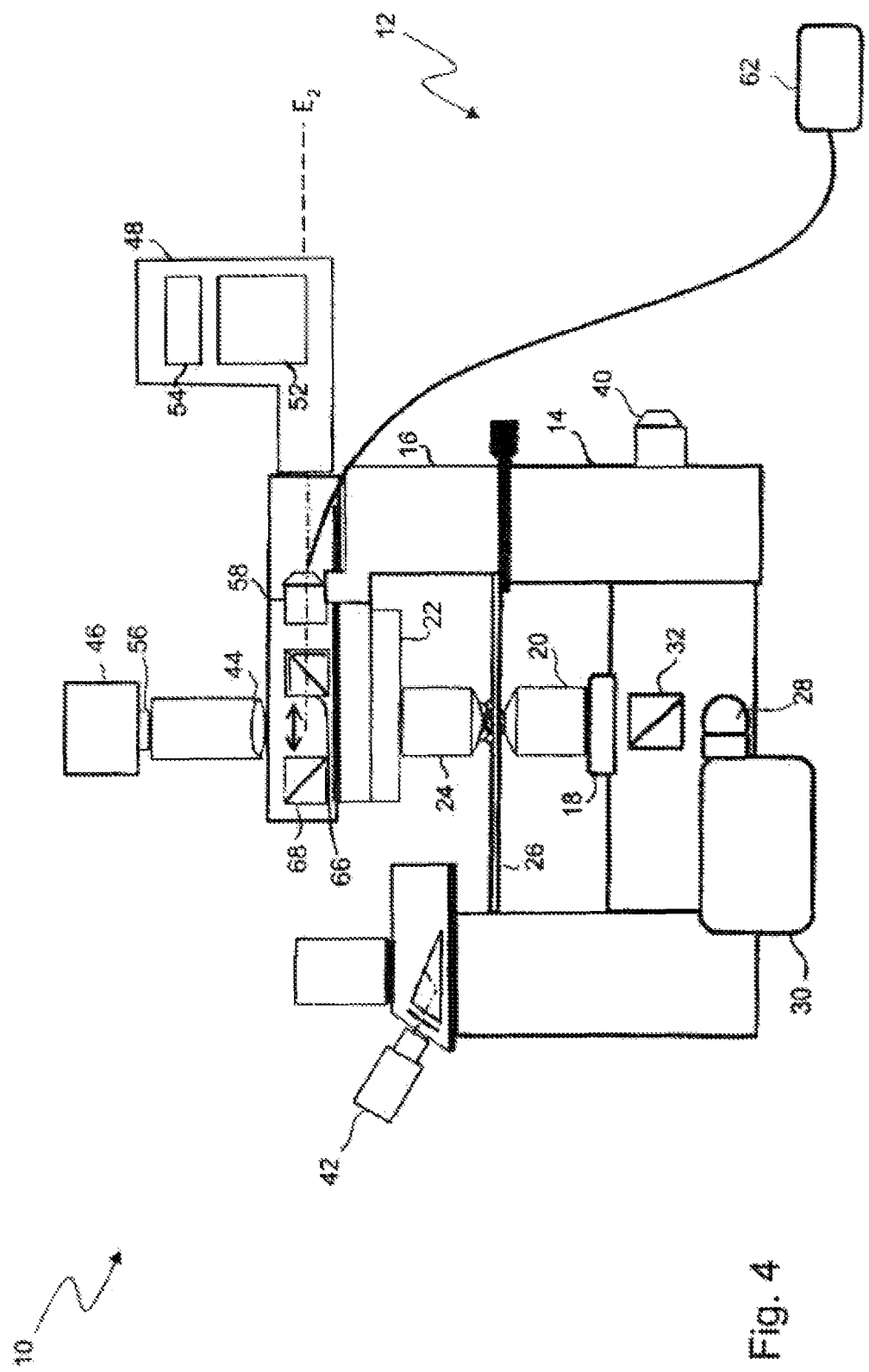
FIG. 4 shows a further modification of the microscope system.

The modified embodiment figure according to FIG. 4 differs from the embodiment according to FIG. 3 by the omission of the eyepieces 60.

Figure 5:
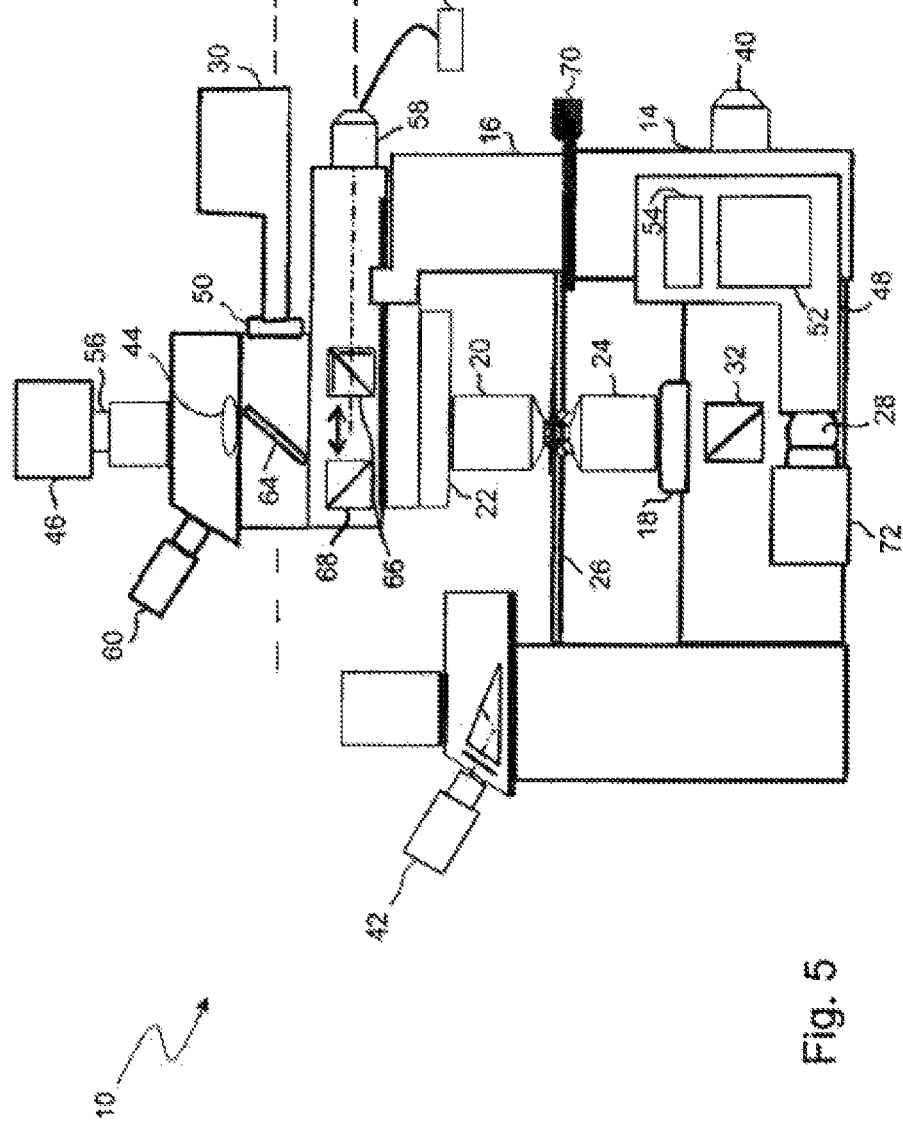
FIG. 5 shows a further modification of the microscope system.

FIG. 5 shows an embodiment that differs from the exemplary embodiment according to FIG. 1 in that the light sheet generation is implemented by way of the upper limb part 16, while the light sheet detection and the confocal illumination and detection are realized in the lower limb part 14. Accordingly, the light sheet generator 30 is coupled to the upper limb part 16 in the first interface plane $E_1$ in the embodiment according to FIG. 5. Further, the confocal illumination module 48 is attached to the lower limb part 14. Moreover, the embodiment shown in FIG. 5 has a further area detector 72, e.g., in the form of a CCD or CMOS camera, in the lower limb part 14. The further area detector 72 detects the detection light originating from the sample illuminated by the light sheet.

Figure 6:
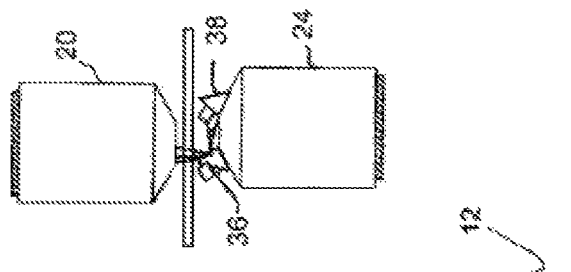
FIG. 6 shows an illustration of the two objectives provided in the microscope system according to FIG. 5.

In relation to the embodiment according to FIG. 1, the arrangement of the light sheet illumination objective 20 and of the common illumination/detection objective 24 has been interchanged in the embodiment illustrated in FIG. 5, i.e., the light sheet/illumination objective 20 is situated at the upper limb part 16 while the common illumination/detection objective 24 is disposed at the lower limb part 14. Accordingly, as shown in FIG. 6, the two mirror elements 36, 38 attached to the light sheet illumination objective 20 are situated below the microscope stage 26.

Figure 7:
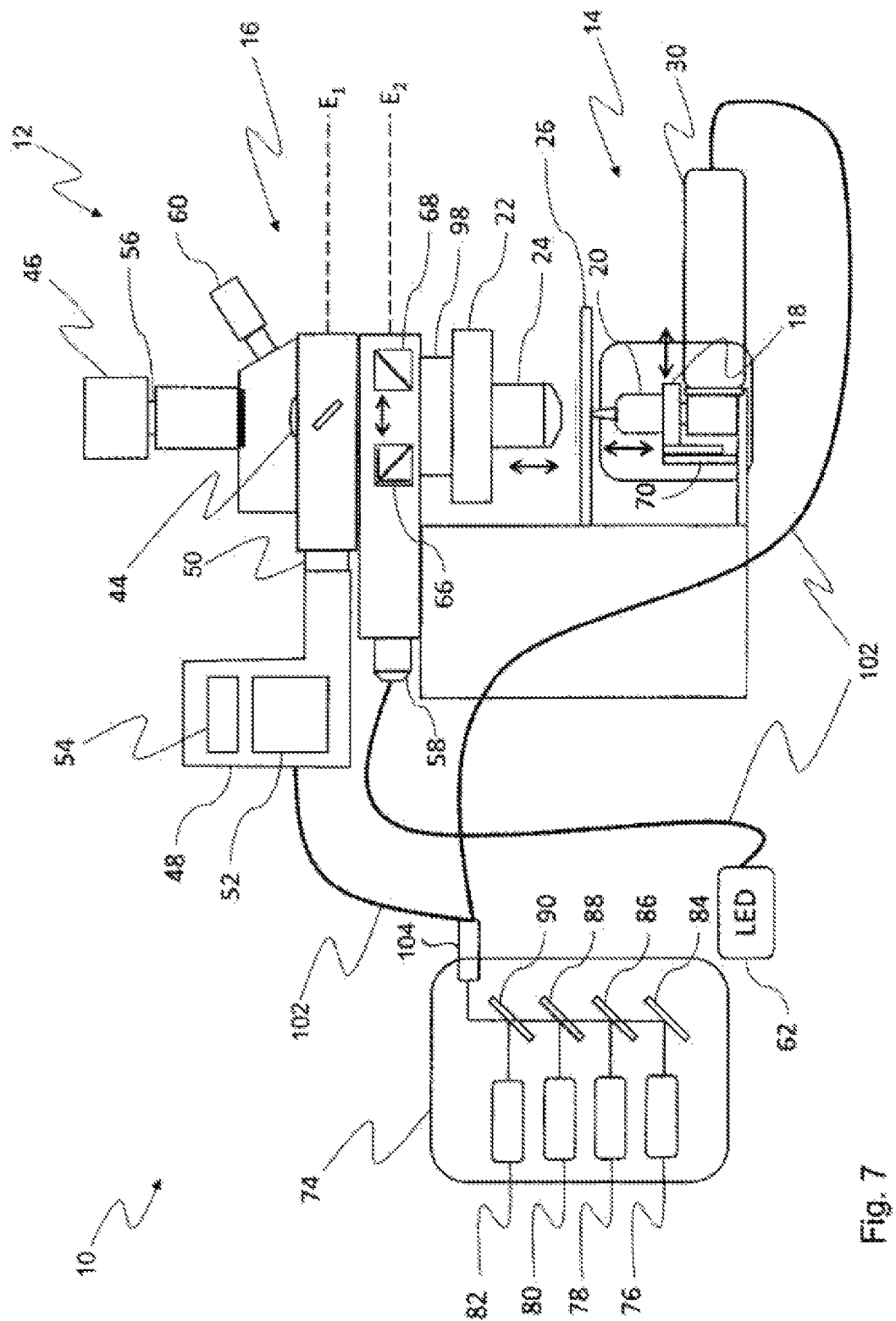
FIG. 7 shows a further modification of the microscope system.

To the extent that it matters to the present invention, the embodiment illustrated in FIG. 7 substantially corresponds to the exemplary embodiment according to FIG. 3, apart from the fact that the light sheet generator 30 is coupled via an optical fiber 102 to a multi-color light source 74. The multi-color light source 74 contains a plurality of monochrome light sources 76, 78, 80, 82, which supply illumination light with different colors to the light sheet generator 30 via a plurality of dichroic mirrors 84, 86, 88, 90. Alternatively, the multi-color light source 74 may also consist of, or comprise, a white light laser, which supplies a continuous broad spectrum of wavelengths. In particular, a combination of white light laser and monochrome light sources is also conceivable. At the same time, the multi-color light source 74 is also connected to the confocal illumination module 48 by a further optical fiber 102 and also serves as a light source for the upper limb part 16. In contrast to the preceding embodiments, the lower limb part 14 was moreover reduced to the objective port 18 and the light sheet generator 30 and, in particular, eyepieces 42 for the lower limb part 14 were dispensed with. Here, the objective port 18 (the objective port 18 is a subunit of the lower limb part 14) can be displaced both parallel to the optical axis of the light sheet/illumination objective 20 and in a plane perpendicular to the optical axis of the light sheet/illumination objective 20 by means of the displacement unit 70. Moreover, the objective port 22 (the objective port 22 forms a subunit of the upper limb part 16) can be moved parallel to the optical axis of the illumination/detection objective 24 by way of a further displacement unit 98. Thus, the adjustment apparatus comprises two displacements units 70, 98 in this case.

Here, the multi-color light source 74 can be connected via an optical switch 104 to the optical fibers 102, which serve for coupling to the light sheet generator 30 and the confocal illumination module 48. In this case, the optical switch 104 can be an optical component with the function of a switch, which supplies in each case completely the light either to the light sheet generator 30 or to the confocal illumination module 48 such that the two functional units (the light sheet microscopy functional unit and the light microscopy functional unit) illuminate the sample in sequence. Alternatively, the optical switch 104 can also be an optical component with the function of a splitter that supplies a first portion of the light to the light sheet microscopy functional unit and a second portion of the light to the confocal microscopy functional unit such that these illuminate the sample at the same time. Here, the optical switch 104 can comprise, for example, a switchable mirror, an acousto-optic component, such as e.g., an acousto-optic modulator (AOM) or an acousto-optic deflector (AOD) or an electro-optic modulator (EOM).

Figure 8:
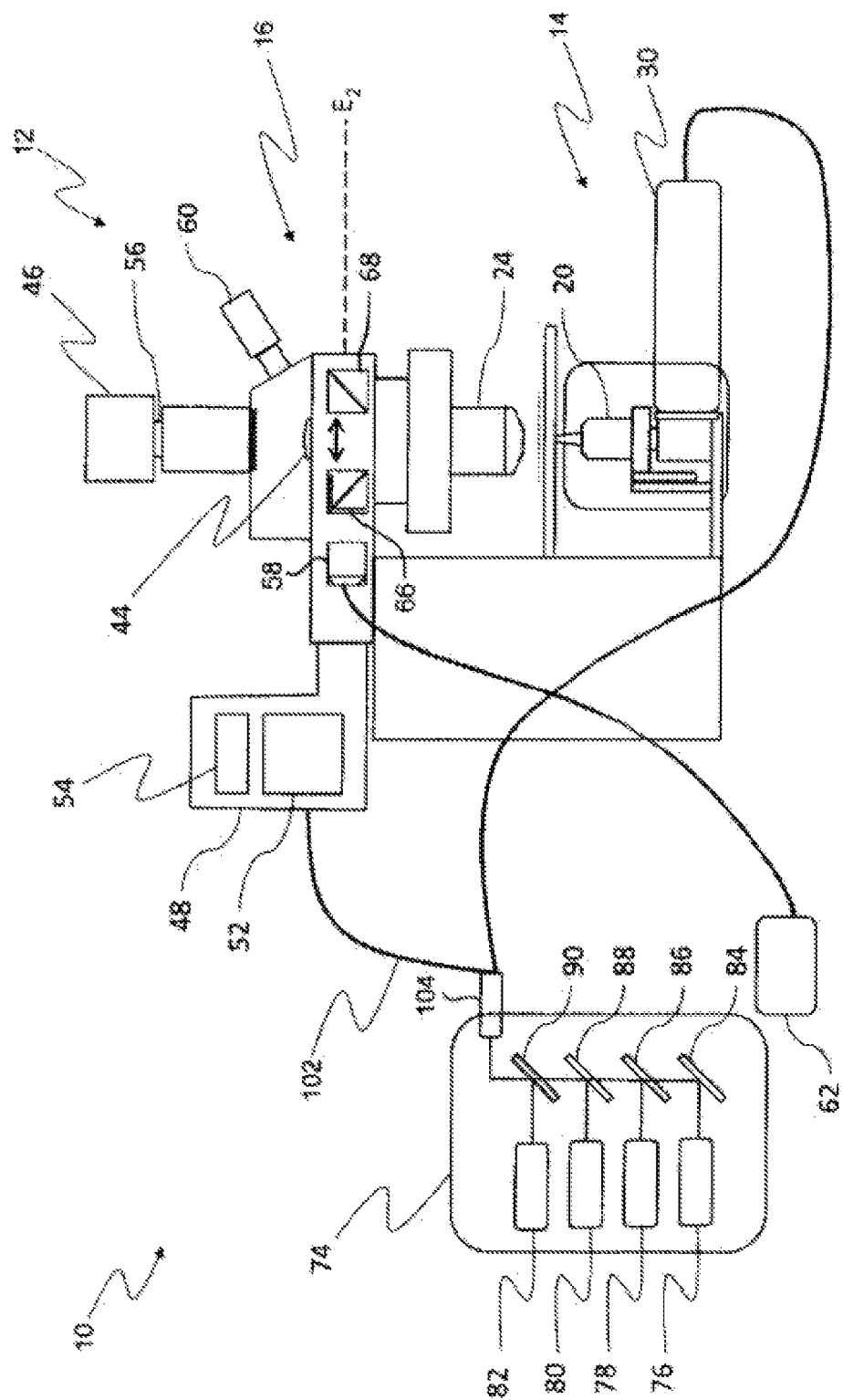
FIG. 8 shows a further modification of the microscope system.

The embodiment according to FIG. 8 substantially corresponds to the arrangement shown in FIG. 7, apart from the fact that the confocal illumination module 48 is disposed not in the interface plane $E_1$ as in FIG. 7 but in the interface plane $E_2$, i.e., along the reflected light axis.

Figure 9:
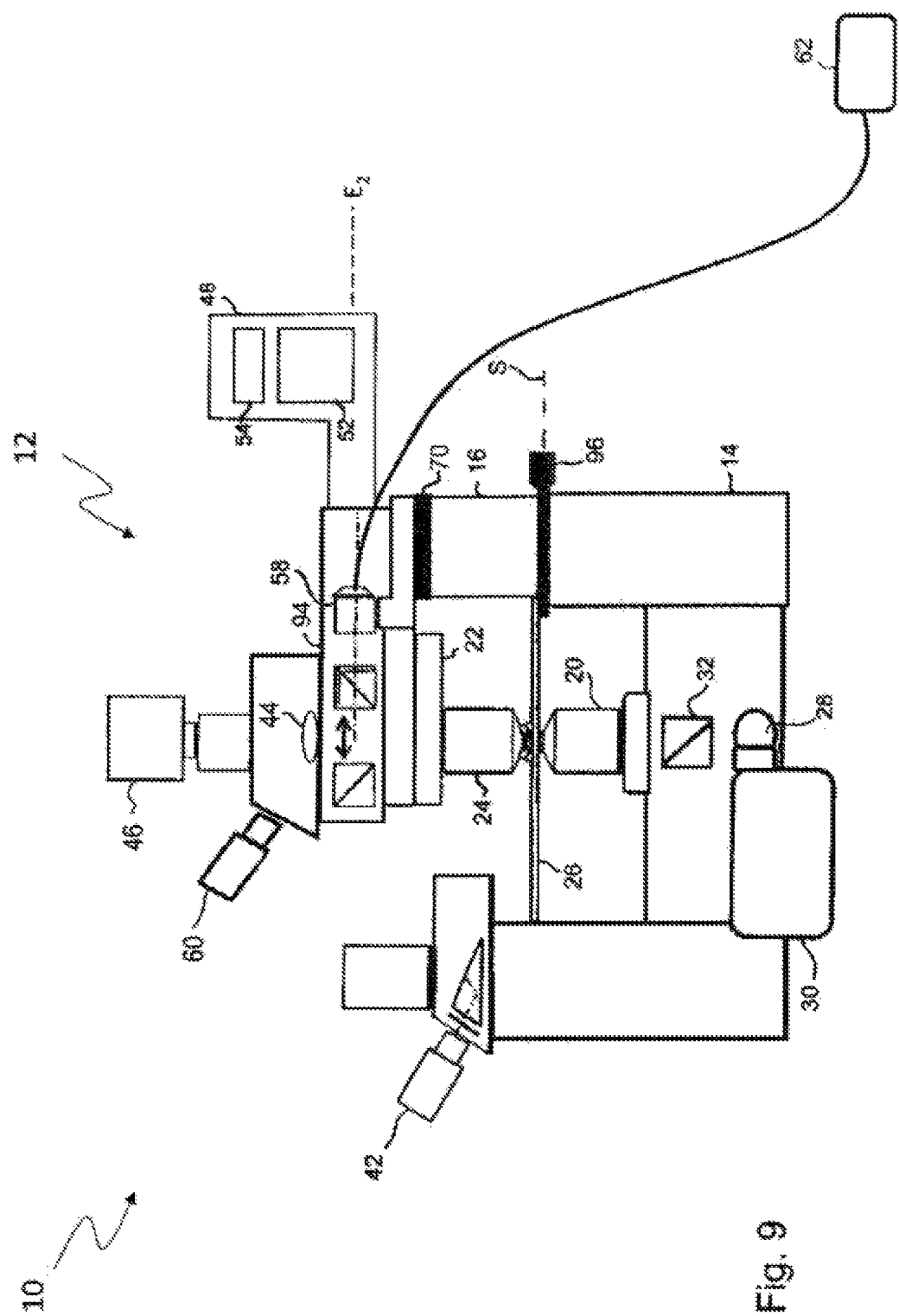
FIG. 9 shows a further modification of the microscope system.

FIG. 9 shows an embodiment of the microscope system 10 that is based on the exemplary embodiment according to FIG. 3. In contrast to the embodiment illustrated in FIG. 3, the displacement unit 70 in the arrangement of FIG. 9 has the function of displacing in lateral fashion in the xy-plane not the upper limb part 16 as a whole but only a subunit, denoted by 94 in FIG. 9, of the upper limb part 18, on which the common illumination/detection objective 24 is held. Additionally, the microscope system 10 according to FIG. 9 comprises a pivot unit 96, by means of which the upper limb part 16 can be pivoted as a whole about a pivot axis S parallel to the x-axis. In this way, the objective 24 can be adjusted relative to the objective 20 in a coupled displacement/pivot movement.

Figure 10:
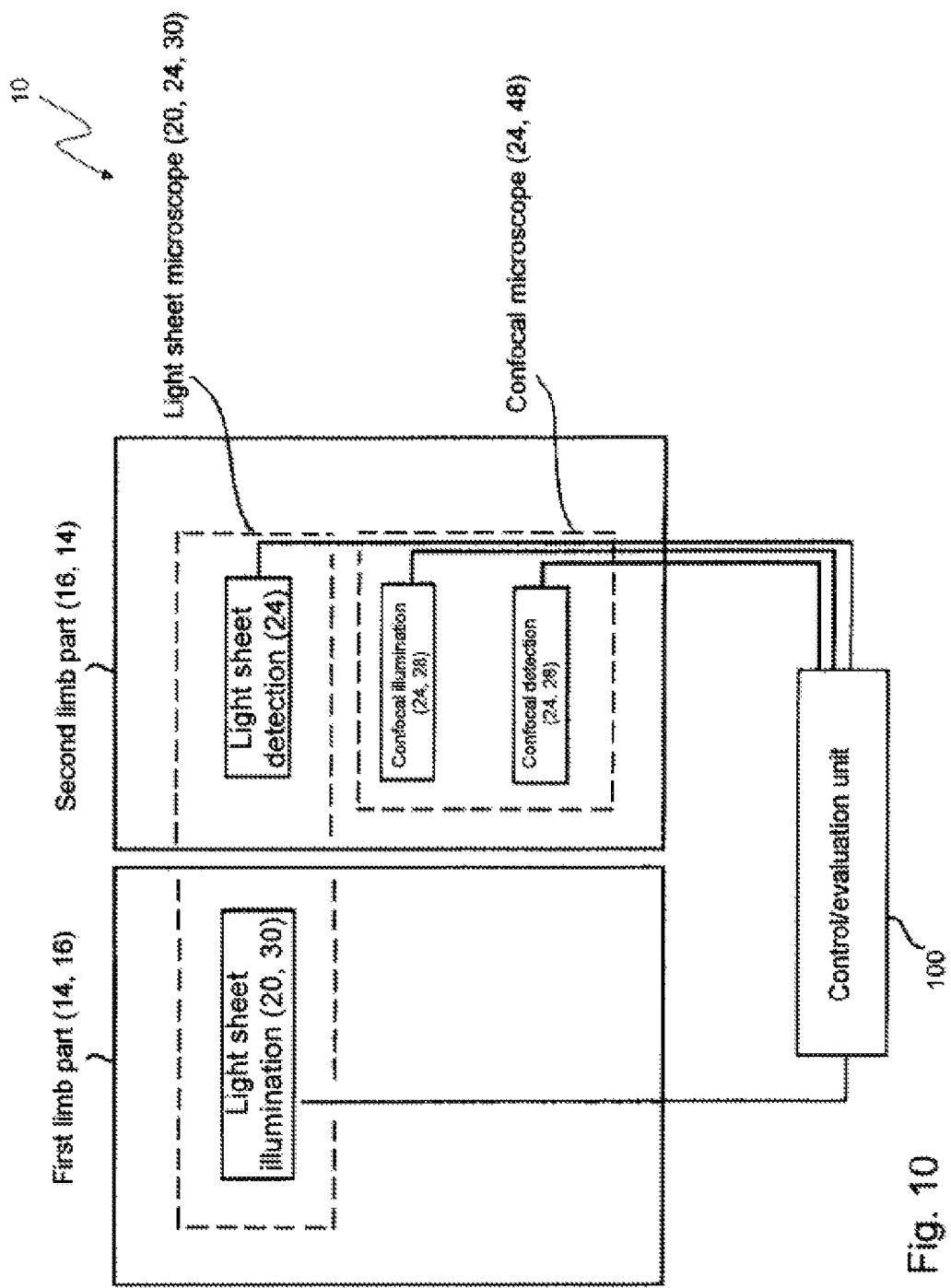
FIG. 10 shows a block diagram of the microscope system.

Finally, the block diagram according to FIG. 10 once again purely schematically elucidates how the two objectives 20 and 24, the light sheet generator 30 and the confocal illumination module 48 are assigned, firstly, functionally to the two functional units forming the light sheet microscope and the confocal microscope and assigned, secondly, to the two limb parts 14, 16 in space. The aforementioned functional units are illustrating using dashed lines in FIG. 10. Further, FIG. 10 shows a control/evaluation unit 100, which controls the overall operation of the microscope system 10. Here, the control unit/evaluation unit 100 is embodied, in particular, to evaluate image data in such a way that the data obtained by the confocal microscope are correlated to image data generated by the light sheet microscope.

The embodiments explained above should merely be understood in an exemplary manner. Thus, the attention should be drawn to the fact that, in particular, individual aspects of various embodiments can readily be combined with one another.

In the described embodiments, the further light microscopy functional unit according to the invention forms a confocal microscope. It is self-evident that this functional unit may also represent a point-imaging microscope of a different type, e.g., a multiphoton microscope, a STED microscope, an RESOLFT microscope or a CARS/SRS microscope. Further, the functional unit can also be embodied as a wide-field microscope, in particular as a localization microscope.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Microscope system
12 Microscope limb
14 Upper limb part
16 Lower limb part
18 Objective port
20 Objective
22 Objective port
24 Objective
26 Microscope stage
28 Port
30 Light sheet generator
32 Dichroic beam splitter
34 Illumination focus
36, 38 Mirror elements
40 Port
42 Eyepiece
44 Tube optical unit
46 Area sensor
48 Confocal illumination module
50 Port
52 Confocal scanner
54 Point sensor
56 Port
58 Port
60 Eyepiece
62 LED lamp
64 Beam splitter mirror
66 Fluorescence cube
68 Dichroic beam splitter
70 Displacement unit
72 Further area detector
74 Multi-colored light source
76-82 Light sources
84-90 Dichroic mirrors
94 Subunit
96 Pivot unit
98 Further displacement unit
100 Control/evaluation unit
102 Optical fiber
104 Optical switch

The invention claimed is:

1. A microscope system comprising:
   a light sheet microscopy functional unit having an illumination objective which is formed by a first objective and a detection objective which is formed by a separate second objective; and
   at least one further light microscopy functional unit comprising a detection objective that is formed by the second objective; and
   an evaluation unit configured to perform a correlated image evaluation based on detection light in each case received by the light sheet microscopy functional unit and the further light microscopy functional unit by way of the commonly used detection objective that is formed by the second objective.

2. The microscope system as claimed in claim 1, wherein the further light microscopy functional unit comprises an illumination objective that is formed by the second objective.

3. The microscope system as claimed in claim 1, further comprising a light deflection apparatus configured to deflect an illumination focus into a focal plane of the second objective, the illumination focus having been generated by the light sheet microscopy functional unit by way of the first objective.

4. The microscope system as claimed in claim 3, wherein the light deflection apparatus comprises at least one mirror element that deflects the illumination focus perpendicular to the optical axis of the second objective.

5. The microscope system as claimed in claim 1, wherein the further light microscopy functional unit forms a point-scanning microscope.

6. The microscope system as claimed in claim 5, wherein the scanning microscope is a confocal microscope, a multiphoton microscope, a STED microscope, a RESOLFT microscope, an FCS microscope, a spectral microscope, a FLIM microscope or a CARS/SRS microscope.

7. The microscope system as claimed in claim 1, wherein the further light microscopy functional unit is a wide-field microscope.

8. A microscope system comprising:
   a light sheet microscopy functional unit having an illumination objective which is formed by a first objective and a detection objective which is formed by a separate second objective;
   at least one further light microscopy functional unit comprising a detection objective that is formed by the second objective; and
   a microscope limb that is composed of a first limb part, at which the first objective is held, and a second limb part, at which the second objective is held lying opposite to the first objective.

9. The microscope system as claimed in claim 8, wherein the light sheet microscopy functional unit has an area sensor disposed in the second limb part and configured to detect the detection light received by the second objective.

10. The microscope system as claimed in claim 9, wherein the area sensor of the light sheet microscopy functional unit simultaneously forms a non-descanned detector assigned to the further light microscopy functional unit and configured to detect the detection light received by the second objective.

11. The microscope system as claimed in claim 8, wherein the further light microscopy functional unit comprises an illumination module assigned to the second limb part and configured to provide a point-scanning sample illumination and/or for a wide-field sample illumination.

12. The microscope system as claimed in claim 11, wherein the illumination module contains a scanner configured to provide for the point-scanning sample illumination.

13. The microscope as claimed in claim 12, wherein the illumination module comprises a point sensor which forms a descanned detector for the detection light received by the second objective.

14. The microscope system as claimed in claim 8, wherein the light sheet microscopy functional unit comprises a light sheet generator which is assigned to the first limb part.

15. The microscope system as claimed in claim 8, further comprising an adjustment apparatus configured to adjust the second limb part or a subunit of the second limb part relative to the first limb part or relative to a subunit of the first limb part.

16. The microscope system as claimed in claim 15, wherein the adjustment apparatus comprises a displacement unit that is embodied to displace the second limb part or the subunit of the second limb part relative to the first limb part or relative to the subunit of the first limb part in a displacement plane that lies perpendicular to the optical axis of the first objective and perpendicular to the optical axis of the second objective.

17. The microscope system as claimed in claim 15, wherein the adjustment apparatus comprises a pivot unit that is embodied to pivot the second limb part or the subunit of the second limb part relative to the first limb part or relative to the subunit of the first limb part about a pivot axis that lies perpendicular to the optical axis of the first objective and perpendicular to the optical axis of the second objective.

18. The microscope system as claimed in claim 17, wherein the adjustment apparatus comprises a displacement unit that is embodied to displace the second limb part or the subunit of the second limb part relative to the first limb part or relative to the subunit of the first limb part in a displacement plane that lies perpendicular to the optical axis of the first objective and perpendicular to the optical axis of the second objective, wherein the displacement unit is embodied to displace the subunit of the second limb part relative to the first limb part in the displacement plane lying parallel to a focal plane of the second objective and the pivot unit is embodied to pivot the second limb part in the totality thereof relative to the first limb part about the pivot axis.

19. The microscope system as claimed in claim 8, wherein the further light microscopy functional unit is assigned in the totality thereof to the second limb part.

20. The microscope system as claimed in claim 8, wherein, in the use position and orientation of the microscope system, one of the two limb parts is a lower limb part and the other limb part is an upper limb part.

21. A method for microscopic imaging of a sample using a microscope system comprising a light sheet microscopy functional unit having an illumination objective which is formed by a first objective and a detection objective which is formed by a separate second objective, and at least one further light microscopy functional unit, the method comprising:

utilizing the second objective as a common detection objective, both for imaging the sample by the light sheet microscopy functional unit and for imaging the sample by the further light microscopy functional unit; and performing a correlated image evaluation based on detection light in each case received by the light sheet microscopy functional unit and the further light microscopy functional unit by way of the commonly used detection objective that is formed by the second objective.

* * * * *